United States Patent [19]
Riley

[11] Patent Number: 5,543,999
[45] Date of Patent: Aug. 6, 1996

[54] SURGE PROTECTOR FOR COMPUTER EQUIPMENT

[76] Inventor: Andrew T. Riley, 1050 33rd St. NE., Rio Rancho, N.M. 87124

[21] Appl. No.: 338,280

[22] Filed: Nov. 14, 1994

Related U.S. Application Data

[63] Continuation of Ser. No. 950,298, Sep. 24, 1992, abandoned.

[51] Int. Cl.$^6$ ..................................................... H02H 3/22
[52] U.S. Cl. ................................................ 361/119; 361/56
[58] Field of Search ............................. 361/91, 56, 111, 361/118, 119, 117

[56] References Cited

U.S. PATENT DOCUMENTS

| | | | |
|---|---|---|---|
| 3,693,053 | 9/1972 | Anderson | 361/118 |
| 4,438,477 | 3/1984 | Cawley | 361/119 |
| 4,659,161 | 4/1987 | Holcomb | 339/113 L |
| 4,695,916 | 9/1987 | Satoh et al. | 361/56 |
| 4,740,859 | 4/1988 | Little | 361/56 |
| 4,862,311 | 8/1989 | Rust et al. | 361/91 |
| 4,878,145 | 10/1989 | Lace | 361/118 |
| 4,903,161 | 2/1990 | Huber et al. | 361/56 |
| 4,912,589 | 3/1990 | Stolarczyk | 361/56 |
| 4,922,382 | 5/1990 | Hobbins | 361/424 |
| 5,010,438 | 4/1991 | Brady | 361/56 |

*Primary Examiner*—Jeffrey A. Gaffin
*Assistant Examiner*—Sally C. Medley
*Attorney, Agent, or Firm*—DeWitt M. Morgan; Kevin Lynn Wildenstein

[57] ABSTRACT

An over voltage protector for electronics equipment, such as a computer terminal, which includes first and second electrical connectors and at least one line intersecting these connectors. The protector also includes a ground which is isolated from both the connectors and the line. The line includes a resistor. The line is also connected to the protector ground via an MOV in series with a diode. With this arrangement, when a surge appears on the line the resistance on this line causes the surge to dump to ground. The diode prevents the surge from re-entering the line. The protector also includes apparatus to connect the protector ground to the building's electrical ground. This apparatus includes a grounded power cord (or grounded power cord adapter) for the equipment, a wire connected between the protector ground and the ground line of the power cord, and a capacitor and a diode connected in parallel on the ground line of the power cord for preventing any surge from entering the equipment.

10 Claims, 1 Drawing Sheet

SURGE PROTECTOR FOR COMPUTER EQUIPMENT

This is a continuation of application Ser. No. 07/950,298 filed on Sep. 24, 1992 now abandoned.

BACKGROUND OF THE INVENTION

This invention relates to circuit protection for electronic equipment, particularly a circuit which protects computer equipment such as terminals from destructive power surges such as can be and are caused by lightning.

DESCRIPTION OF THE PRIOR ART

With the proliferation of mainframe computers and minicomputers it has been quite common for such equipment to be simultaneously accessed by a number of terminals. Such terminals typically consist of a keyboard and screen with a logic interface board.

While these configurations work well, the terminals are, typically, not protected from power surges such as induced by lightning or AC power line disturbances. A lightning induced surge may be in the order on 6,000 v. Such surges will often burn out the logic interface.

There are a number of voltage protection devices disclosed in the prior art. U.S. Pat. No. 4,862,311 to W. Rust et al. discloses an overvoltage protector connected between a standard data cable and the piece of equipment to which such data cable would ordinarily be directly connected. The protector includes first and second connectors 14 and 16 having shells of electrically conductive material and which are electrically interconnected via a ground plate 22. Each of the circuits 30 within the protector is connected to plate 22 via a bipolar silicon avalanche diode 32 in parallel with a gas discharge tube 34.

Another surge protector is disclosed in U.S. Pat. No. 4,878,145 to M. A. Lace in which transient protector devices 80 and 90 are connected in series with cables that supply data to and transmit data from a main frame computer 60. Surge protector 80 includes a number of gas discharge tubes and metal oxide varistors.

Other surge/protection devices are disclosed in U.S. Pat. Nos. 4,695,916 to H. Satoh et al., 4,740,859 to H. A. Little, 4,922,382 to K. A. W. Hobbins, 4,903,161 to P. G. Huber et al., 4,912,589 to D. W. Stolarczyk, 5,010,438 to P. J. Brady and 4,659,161 to K. L. Holcomb.

It is the object of the present invention to provide a circuit protector for computer equipment such as terminals, which is fast acting, reliable, of simple construction, and easy to install.

SUMMARY OF THE INVENTION

An overvoltage protector for electronics equipment, such as computer terminal, which includes first and second electrical connectors supported on a piece of electrically insulating material and at least one line intersecting these two connectors. The protector also includes a ground which is isolated from both the connectors and the line. The line includes a resistor. The line is also connected to the protector ground via means which has a high resistance, except in the presence of a voltage surge, in which case it passes the surge to the protector ground. With this arrangement, when a surge appears on the line the resistance on this line causes the surge to dump to the protector ground through the means. The means also prevents the surge from re-entering the line. Preferably the means is an MOV connected in series with a diode.

The protector also includes apparatus to connect the protector ground to the building's electrical ground. This apparatus includes a grounded power cord (or grounded power cord adapter) for the equipment, a wire connected between the protector ground and the ground line of the power cord, and means (a capacitor or, preferably a capacitor and a diode connected in parallel) on the ground line of the power cord for preventing any surge from entering the equipment.

A plurality of lines typically connect the electrical connectors on the insulating material, including shield ground, a data transmit line, a data receive line and a signal ground. The signal and shield grounds each include a resistor and diode in series. All lines are connected to the ground protector via an MOV and diode connected in series.

DESCRIPTION OF THE PREFERRED EMBODIMENT

Figure 1:
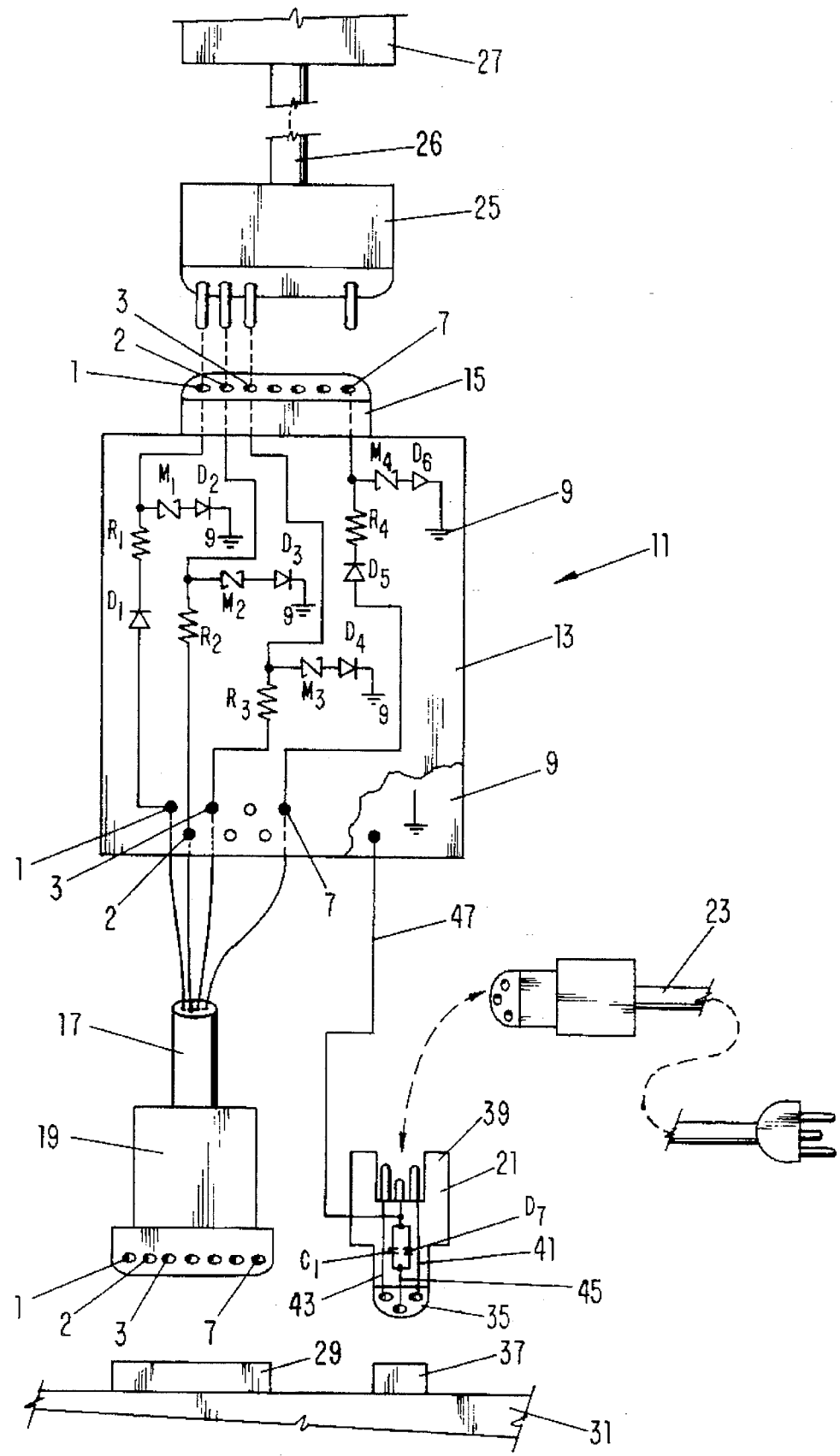
FIG. 1 is a schematic of the preferred form of the invention.

With reference to the drawing the overvoltage protector 11 of the present invention includes a circuit board 13, a female connector 15, a shielded cable 17, a male connector 19, a power cord adaptor 21, and a standard grounded power cord 23.

Female connector 15 is a standard 25 pin RS232 connector which is designed to, for instance, be connected to a mating male 25 pin RS232 connector 25 which terminates the shielded data cable 26 coming from computer 27 (e.g., a minicomputer, PC, or main frame). Similarly, connector 19 is a standard 25 pin RS232 male connector which is designed to be received in mating connector 29 provided on terminal 31. For purposes of illustration, only pins 1, 2, 3 and 7 on connectors 15 and 19 are wired to each other, via lines 1, 2, 3 and 7 in cable 17 and on board 13.

Board 13 which is, preferably, a printed circuit board, includes lines 1, 2, 3 and 7 as well as circuit board ground 9. Line 1, which is the shield ground for cables 17 and 26, includes resistor $R_1$ in series with diode $D_1$. Line 1 is connected to ground 9 via a metal oxide varistor (MOV) $M_1$ in series with diode $D_2$. Line 2, which is the transmit line from terminal 31 to computer 27, includes resistor $R_2$. Like line 1, line 2 is connected to ground 9 via MOV $M_2$ and diode $D_3$. Line 3, the receive data line, includes resistor $R_3$ and is connected to ground 9 by MOV $M_3$ in series with diode D4. Finally, signal ground line 7, which includes resistor $R_4$ in series with diode $D_5$, is connected to ground 9 via MOV $M_4$ in series with diode $D_6$. All diodes $D_1$–$D_6$ are 1N4007; all MOVs $M_1$–$M_4$, 7 mm 18 v 250A; and all resistors $R_1$–$R_4$, 1.5 $K_\Omega$. As those skilled in the art will appreciate, ground 9 is isolated from ground lines 1 and 7 via printed circuit board design techniques.

Adaptor 21 includes a female connector end 35, which has an external configuration such as found on a standard power supply cord and which is adapted to be received in a conventional male power supply connector 37, provided on terminal 31 adjacent connector 29. Adaptor 21 also includes a male connector end 39 of conventional design. Finally, adaptor includes power lines 41, 43 and ground line 45. Ground line 45 includes a 1N4007 diode $D_7$ in parallel with capacitor $C_1$ (10 μF 100 v). Ground 45 is also connected to circuit board ground 9, via wire 47.

The capacitor $C_1$ is needed to give terminal 31 proper ground reference relative to computer 27 without being tied directly to ground. Terminal 31 needs the same ground reference as computer 27 in order to function properly.

Power cord 23 connects, via adaptor 21, terminal 31 to a standard grounded wall outlet (not shown).

Under normal operating conditions MOVs $M_1$–$M_4$ provide very high resistance. Thus, the data signals on lines 2 and 3 pass through resistors $R_2$ and $R_3$ between computer 27 and terminal 31. Because of the presence and polarity of diodes $D_1$ and $D_5$, ground lines 1 and 7 will only pass current from, respectively, the shield of cable 17 and terminal 31 to, via cable 26, chassis ground on computer 27.

In operation, when a voltage surge enters, for instance, line 2, at pin 2 on female connector 15, resistance $R_2$ on this line Causes the surge to dump through MOV $M_2$, and then pass through diode $D_3$ to ground 9 of circuit board 13. As MOVs are bidirectional, the use of diodes $D_2$, $D_3$, $D_4$ and $D_6$, in the polarity illustrated in the Figure is necessary to prevent the surge from re-entering line 2 or lines 1, 3, or 7. As previously stated, the ground 9 is isolated from the ground lines 1 and 7. Otherwise lines 1 and 7 would also surge and cause equipment failure. This arrangement forces the surge to continue from ground 9 through wire 47 to ground line 45 of adaptor 21. Diode $D_7$ and capacitor $C_1$ isolate terminal 31, which forces the surge to enter the ground line of power cord 23 and, thus, the ground line in the building wiring.

Whereas the drawings and accompanying description have shown and described the preferred embodiment of the present invention, it should be apparent to those skilled in the art that various changes may be made in the form of the invention without affecting the scope thereof.

What I claim is:

1. An overvoltage protector for electronic equipment comprising:
   a) first and second spaced apart connectors;
   b) a data transmit line including a first resistor, said data transmit line electrically interconnecting said connectors;
   c) a data receive line including a second resistor, said data receive line electrically interconnecting said connectors;
   d) a signal ground line including a third resistor, said signal ground line electrically interconnecting said connectors, said signal ground line, said data transmit line and said data receive line being electrically isolated from each other;
   e) a protector ground electrically isolated from both of said connectors, said protector ground further electrically isolated from said data transmit line, said data receive line and said signal ground line;
   f) means for connecting said data transmit line to said protector ground by a first electrical circuit, said first electrical circuit characteristically including a low resistance only in the presence of an electrical surge on said data transmit line, said first electrical circuit including a first unidirectional means for allowing said surge to form a unidirectional path to said protector ground, said first electrical circuit adapted to characteristically prevent any transient reverse surge from reentering said data transmit line;
   g) means for connecting said data receive line to said protector ground by a second electrical circuit, said second electrical circuit characteristically including a low resistance only in the presence of an electrical surge on said data receive line, said second electrical circuit including a second unidirectional means for allowing said surge to form a unidirectional path to said protector ground, said second electrical circuit adapted to characteristically prevent any transient reverse surge from reentering said data receive line; and
   h) means for connecting said signal ground line to said protector ground by a third electrical circuit, said third electrical circuit characteristically including a low resistance only in the presence of an electrical surge on said signal ground line, said third electrical circuit including a third unidirectional means for allowing said surge to form a unidirectional path to said protector ground, said third electrical circuit adapted to characteristically prevent any transient reverse surge from reentering said signal ground line.

2. The overvoltage protector as set forth in claim 1, wherein:
   a) said first electrical circuit includes a first metal oxide varistor and a first diode, said first diode and said first metal oxide varistor being electrically connected in series, said first diode of said first electrical circuit being disposed between said first metal oxide varistor and said protector ground;
   b) said second electrical circuit includes a second metal oxide varistor and a second diode, said second diode and said second metal oxide varistor being electrically connected in series, said second diode of said second electrical circuit being disposed between said second metal oxide varistor and said protector ground; and
   c) said third electrical circuit includes a third metal oxide varistor and a third diode, said third diode and said third metal oxide varistor being electrically connected in series, said third diode of said third electrical circuit being disposed between said third metal oxide varistor and said protector ground.

3. The overvoltage protector as set forth in claim 1, wherein each of said first, second and third means for allowing said surge to form a unidirectional path includes a metal oxide varistor and a diode, said diode and said varistor electrically connected in series, each of said diodes each of said first, second and third means for allowing said surge to form a unidirectional path being disposed between of said first, second and third varistor and said protector ground.

4. The overvoltage protector as set forth in claim 1, wherein each of said first, second and third means for preventing any transient reverse surge includes a metal oxide varistor and a diode, said diode and said varistor electrically connected in series, each of said diodes of said first, second and third means for preventing any transient reverse surge being disposed between each of said first, second and third varistor and said protector ground.

5. The overvoltage protector as set forth in claim 1 further including a means for connecting said protector ground to a reference electrical ground line in a building.

6. The overvoltage protector as set forth in claim 5 wherein said connecting means includes means for providing power to said equipment, said means for providing power including a means for connecting said equipment to said reference electrical ground line in said building.

7. The overvoltage protector as set forth in claim 6 wherein said means for providing power to said equipment further comprises a means for preventing said surge from entering said equipment.

8. The overvoltage protector as set forth in claim 7 wherein said means for preventing said surge from entering includes a capacitor.

9. The overvoltage protector as set forth in claim 7, wherein said means for preventing said surge from entering includes a diode, said diode electrically disposed in parallel with said capacitor.

10. The overvoltage protector as set forth in claim 1 wherein said signal ground line includes a fourth means for allowing said surge to form a unidirectional path to said protector ground in series with a fourth resistor.

* * * * *